(12) United States Patent
Sawatari et al.

(10) Patent No.: US 7,599,041 B2
(45) Date of Patent: Oct. 6, 2009

(54) LIQUID CRYSTAL DISPLAY

(75) Inventors: Naoko Sawatari, Tokyo-to (JP); Masato Okabe, Tokyo-to (JP); Hideo Hama, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 12/274,525

(22) Filed: Nov. 20, 2008

(65) Prior Publication Data

US 2009/0142865 A1     Jun. 4, 2009

Related U.S. Application Data

(63) Continuation of application No. 10/587,140, filed on Jul. 21, 2006, now Pat. No. 7,553,525.

(30) Foreign Application Priority Data

Jan. 22, 2004     (JP)     ............... 2004-014972

(51) Int. Cl.
C09K 19/02     (2006.01)
G02F 1/141     (2006.01)

(52) U.S. Cl. .................. 349/187; 428/1.2; 349/124; 349/135; 156/242

(58) Field of Classification Search ........... 428/1.1–1.2; 156/242; 349/123–124, 135, 187, 190; 252/299.4, 252/299.68; 345/88–89
See application file for complete search history.

(56) References Cited

U.S. PATENT DOCUMENTS 6,153,272 A * 11/2000 Kim et al. .................... 428/1.5

2002/0085153 A1     7/2002 Choi et al.
2003/0058210 A1 *  3/2003 Yamazaki et al. ............ 345/89
2003/0232930 A1 * 12/2003 Gibbons et al. ............ 525/418

OTHER PUBLICATIONS

Remarks dated Oct. 27, 2008 in parent U.S. Appl. No. 10/587,140, Sawatari et al.*
Remarks dated Oct. 27, 2008 in copending U.S. Appl. No. 10/587,069, Sawatari et al.*
Affidavit dated Dec. 4, 2008 in parent U.S. Appl. No. 10/587,140, Sawatari et al.*
Affidavit dated Dec. 4, 2008 in copending U.S. Appl. No. 10/587,069, Sawatari et al.*

* cited by examiner

*Primary Examiner*—David R Sample
*Assistant Examiner*—Sophie Hon
(74) *Attorney, Agent, or Firm*—Ladas & Parry LLP

(57) ABSTRACT

A liquid crystal display using a ferroelectric liquid crystal, which can give mono-domain alignment of the ferroelectric liquid crystal without forming alignment defects such as zig-zag defects, hairpin defects and double domains and which is so remarkably good in alignment stability that the alignment thereof can be maintained even if the temperature of the liquid crystal is raised to the phase transition point or higher. The liquid crystal display has a ferroelectric liquid crystal sandwiched between two substrates, wherein an electrode and a photo alignment layer are each successively formed on opposite faces of the two substrates facing each other, and a constituent material of the respective photo alignment layer has a different composition with the ferroelectric liquid crystal sandwiched there between.

9 Claims, 3 Drawing Sheets

BRIGHT

DARK

LIQUID CRYSTAL DISPLAY

CROSS-REFERENCE TO RELATED APPLICATIONS

This application is a continuation of U.S. Ser. No. 10/587,140, filed Jul. 21, 2006.

TECHNICAL FIELD

The present invention relates to a liquid crystal display using ferroelectric liquid crystal, more specifically, a liquid crystal display in which a photo alignment layer is used to control the alignment of ferroelectric liquid crystal.

BACKGROUND ART

Since liquid crystal displays have features that it is thin and is low in power consumption and other features, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 1). However, the liquid crystal has a problem that the liquid crystal has memory property but gray scale display cannot be attained since the switching thereof is limited to two states, namely, bright and dark states.

In recent years, attention has been paid to ferroelectric liquid crystal in which the liquid crystal layer thereof is stable in a single state (herein after referred to as "monostable") when no voltage is applied thereto as a liquid crystal which makes it possible to attain gray scale display by the matter that the director (the inclination of the molecule axis) of the liquid crystal is continuously changed by a change in applied voltage so as to analogue-modulate the light transmission thereof (non-patent document 1, FIG. 1). As such liquid crystal exhibiting mono-stability, there is usually used a ferroelectric liquid crystal in which phase change is caused between cholesteric phase (Ch) and chiral smectic C phase (SmC*) via no smectic A phase (SmA). When ferroelectric liquid crystal exhibits mono-stability in this manner, the liquid crystal does not have any memory property and it is desired to drive the liquid crystal through an active matrix system in which an active element such as a transistor or a diode is added to each pixel. In the case of using, in particular, an active matrix system using TFT elements as active elements, high-quality display can be attained since target pixels can be certainly switched on and off.

On the other hand, ferroelectric liquid crystal has a higher order of molecules therein than nematic liquid crystal; therefore, the former liquid crystal is not easily aligned so that defects called zigzag defects or hairpin defects are easily generated. Such defects cause a fall in contrast based on light leakage. In particular, ferroelectric liquid crystal undergoing phase transition via no SmA phase generates two domains different in the layer normal-line direction thereof (herein after referred to as "double domains") (FIG. 2). The double domains give such display that black and white are reversed so as to cause a serious problem (FIG. 3). As the method for removing the double domains, known is an electric field induced technique (, which uses DC voltage during cooling process) of heating a liquid crystal cell to a temperature not lower than the Ch phase thereof, and then cooling the liquid crystal cell slowly while applying a DC voltage thereto (non-patent document 2). This method has problems that the alignment of the liquid crystal is disturbed when the temperature thereof is again raised to a temperature not lower than the phase transition temperature thereof and the alignment is disturbed in regions where no electric field acts between pixel electrodes, and other problems.

As the technique for subjecting liquid crystal to alignment treatment, there is known a method of using an alignment film. The method is classified into the rubbing method and the photo alignment method. The rubbing method is a method of subjecting a substrate coated with a polyimide film to rubbing treatment to align chains of the polyimide polymer in the direction of the rubbing, thereby aligning liquid crystal molecules on the film. The rubbing method is excellent in controllability of the alignment of nematic liquid crystal, and is generally an industrially applicable technique. However, this method has the following problems: the generation of static electricity and dust, unevenness in the power for regulating the alignment and the tilt angle of liquid crystal caused by differences in rubbing conditions, treatment-ununiformity caused when a large area is treated, and so on. Thus, this method is unsuitable as a method for alignment treatment of ferroelectric liquid crystal, in which alignment defects are easily generated. Moreover, the rubbing method cannot overcome double domains.

There is a photo alignment method as a non-contact alignment method substituting the rubbing method. The photo alignment method is a method of radiating light the polarization of which is controlled onto a substrate coated with a polymer film or a monomolecular film to generate photo-excited reaction (decomposition, isomerization or dimerization) so as to give anisotropy to the polymer film or a monomolecular film, thereby aligning the liquid crystal molecules on the film. This method is useful since the generation of static electricity or dust, which is a problem in the rubbing method, does not arise and the alignment treatment can be quantitatively controlled. However, even if this method is used, it is difficult to suppress the generation of double domains and obtain mono-domain alignment.

An other method for making ferroelectric liquid crystal monostable is the polymer stabilization method. The polymer stabilization method is a method of injecting a ferroelectric liquid crystal blended with an ultra violet curable monomer into a liquid crystal cell subjected to alignment treatment, and then radiating ultra violet rays onto the liquid crystal in the state that an AC or DC voltage is applied thereto, thereby polymerizing the monomer to stabilize the liquid crystal. However, the method has problems that the production process thereof is complicated and the voltage for driving the liquid crystal is high.

As still another method for giving mono-domains, the patent document 1 describes a method of subjecting one out of alignment-films on and beneath a ferroelectric liquid crystal to rubbing treatment, and subjecting the other to photo alignment treatment, thereby aligning the ferroelectric liquid crystal. However, according to this method, there remain problems such as the generation of static electricity or dust and treatment-ununiformity generated when a large area is treated, as described above, since only one of the films is rubbed.

On the other hand, in recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, C, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs. However, the field sequential color system is a system in which each pixel is subjected to time sharing; it is therefore necessary for the liquid crystal as the black and white shutter to have high-speed responsiveness in order to give a good moving image display property. If ferroelectric liquid crystal is used, this problem can be solved. However, the ferroelectric liquid crystal has a problem that alignment defects are easily generated, as described above, and thus the color system using this liquid crystal has not been made practicable.

Patent document 1: Japanese Patent Application Laid-Open No. 2003-5223
Non-patent document 1: NONAKA, T., LI, J., OGAWA, A., HORNUNG, B., SCHMIDT, W., WINGEN, R., and DUBAL, H., 1999, Liq. Cryst., 26, 1599.
Non-patent document 2: PATEL, J., and GOODBY, J. W., 1986, J. Appl. Phys., 59, 2355

DISCLOSURE OF INVENTION

Problem to be Solved by the Invention

A main object of the present invention is to provide a liquid crystal display using a ferroelectric liquid crystal, which can give mono-domain alignment of the ferroelectric liquid crystal without forming alignment defects such as double domains and which are so remarkably good in alignment stability that the alignment thereof can be maintained even if the temperature of the liquid crystal is raised to the phase transition point or higher.

Means for Solving the Problem

In light of the above-mentioned situation, the inventors have made eager investigation so as to find out that a photo alignment layer is formed on each of opposite faces of two substrates and materials having different compositions are used as the materials of the upper and lower photo alignment layers, whereby the mono-domain alignment of a ferroelectric liquid crystal there between can be obtained in the state that alignment defects such as double domains are restrained from being generated. Thus, the present invention has been made.

That is, the present invention provides a liquid crystal display comprising a ferroelectric liquid crystal sandwiched between two substrates, wherein an electrode and a photo alignment layer are each successively formed on opposite faces of the two substrates facing each other, and a constituent material of the respective photo alignment layer has a different composition with the ferroelectric liquid crystal sandwiched therebetween.

In the present invention, since a respective photo alignment layer is formed on the opposite faces of the upper and lower substrates facing with each other, and the respective photo alignment layer is made of materials of different compositions with the ferroelectric liquid crystal sandwiched there between, the effect of aligning the ferroelectric liquid crystal without formation of the alignment defects such as the double domain can be achieved. Since the present invention is a liquid crystal display in which the photo alignment layers are used to conduct alignment treatment without depending on the electric field induced technique (which uses DC voltage during cooling process), the invention has an advantage that even if the temperature thereof is raised to the phase transition point thereof or higher, the alignment of the liquid crystal can be maintained so as to restrain alignment defects such as double domains from being generated.

It is preferable that each of the constituent materials of the photo alignment layers is a photo-isomerizable material comprising a photo-isomerization-reactive compound which generates a photo-isomerization reaction to give anisotropy to the respective photo alignment layer. By the use of the photo-isomerizable material, the anisotropy can be given easily to the photo alignment layers.

It is preferable that the photo-isomerization-reactive compound is a compound which has dichroism that different absorptivities are exhibited depending on a polarization direction thereof and further generates the photo-isomerization reaction by a light irradiation. By generating the isomerization of the reactive site aligned in the polarization direction of the photo-isomerization-reactive compound having such properties, anisotropy can easily be given to the photo alignment layers.

In the photo-isomerization-reactive compound, it is preferable that the photo-isomerization reaction is a cis-trans isomerization reaction. This is because anyone of the isomers, a cis-isomer or a trans-isomer, increases by the light irradiation, whereby anisotropy can be given to the photo alignment layers.

The photo-isomerization-reactive compound is preferably a compound having, in a molecule thereof, an azobenzene skeleton for the following reason: any azobenzene skeleton is subjected to the cis-trans isomerization reaction by the irradiation thereof with light; therefore, when the compound having, in the molecule thereof, an azobenzene skeleton is contained as the constituent material of the respective photo alignment layer, anisotropy can easily be given to the photo alignment layer. This is also for the following reason: when the compound has the azobenzene skeleton, the anisotropy given to the respective photo alignment layer is particularly suitable for controlling the alignment of the ferroelectric liquid crystal.

The photo-isomerization-reactive compound is a polymerizable monomer having, as its side chain, an azobenzene skeleton. This is because anisotropy can easily be given to the respective photo alignment layer and the anisotropy can be made stable when the polymerizable monomer having, as its side chain, an azobenzene skeleton contained as the constituent material of the photo alignment layer.

The ferroelectric liquid crystal is preferably a ferroelectric liquid crystal that exhibits mono-stability. This is because the advantageous effects resulting from the structure of the present invention becomes remarkable by using the ferroelectric liquid crystal which exhibits mono-stability as the ferroelectric liquid crystal.

The ferroelectric liquid crystal is preferably a ferroelectric liquid crystal having, in a phase series thereof, no smectic A phase. As described above, the ferroelectric liquid crystal having, in the phase series thereof, no smectic A phase easily generates alignment defects such as double domains. However, when the compositions of the upper and lower photo alignment layers, which sandwich the ferroelectric liquid crystal, are made different from each other, alignment defects such as double domains can be restrained from being generated so that the advantageous effects resulting from the structure of the present invention become remarkable.

The ferroelectric liquid crystal is preferably a ferroelectric liquid crystal which constitutes a single phase. This is because the liquid crystal display of the present invention provides the following advantages: a preferable alignment can be obtained even with a single phase ferroelectric liquid crystal, without the need of using a method such as a polymer stabilizing method for controlling the alignment, so as to facilitate the production process easily while lowering the driving voltage.

The liquid crystal display is preferably driven by an active matrix system using a thin film transistor. This is because the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter in which TFT elements are arranged in a matrix form between the common electrode of the common electrode substrate and the substrate thereof, and use the resultant as a color liquid crystal display.

Moreover, the liquid crystal display is preferably displayed by a field sequential color system for the following reason: the liquid crystal display has fast switching speed and makes it possible to align the ferroelectric liquid crystal therein without forming any alignment defect; therefore, when the display is displayed by the field sequential color system, bright and highly precise display of color moving images which has a wide view angle can be realized at low costs and low power consumption.

Effect of the Invention

The liquid crystal display of the invention is useful since the liquid crystal display makes it possible to align the ferroelectric liquid crystal therein without forming alignment defects such as zigzag defects, hairpin defects or double domains, and further the liquid crystal display is a liquid crystal display so remarkably good in alignment stability that the alignment is not easily disturbed even if the temperature thereof is raised to the phase transition point thereof or higher.

EXPLANATION OF REFERENCES

Figure 1:
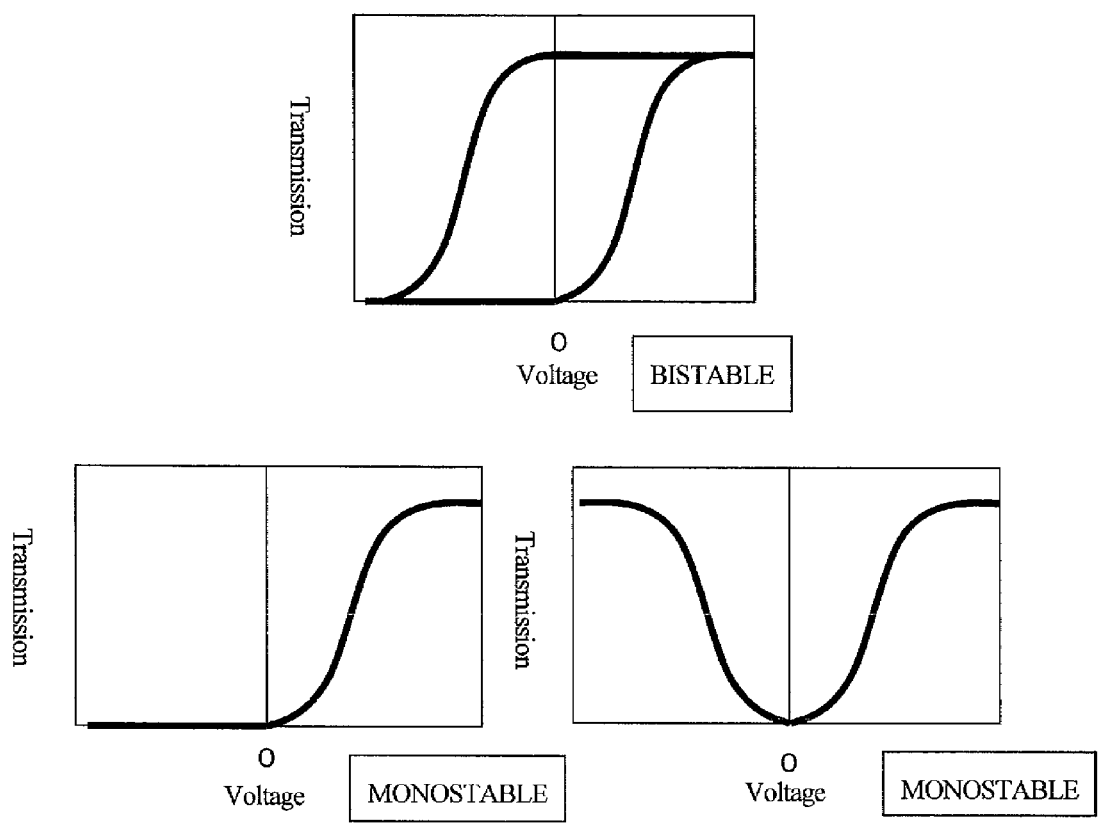
FIG. 1 is a graph showing changes in transmission as a function of voltage applied to ferroelectric liquid crystals.
Figure 2:
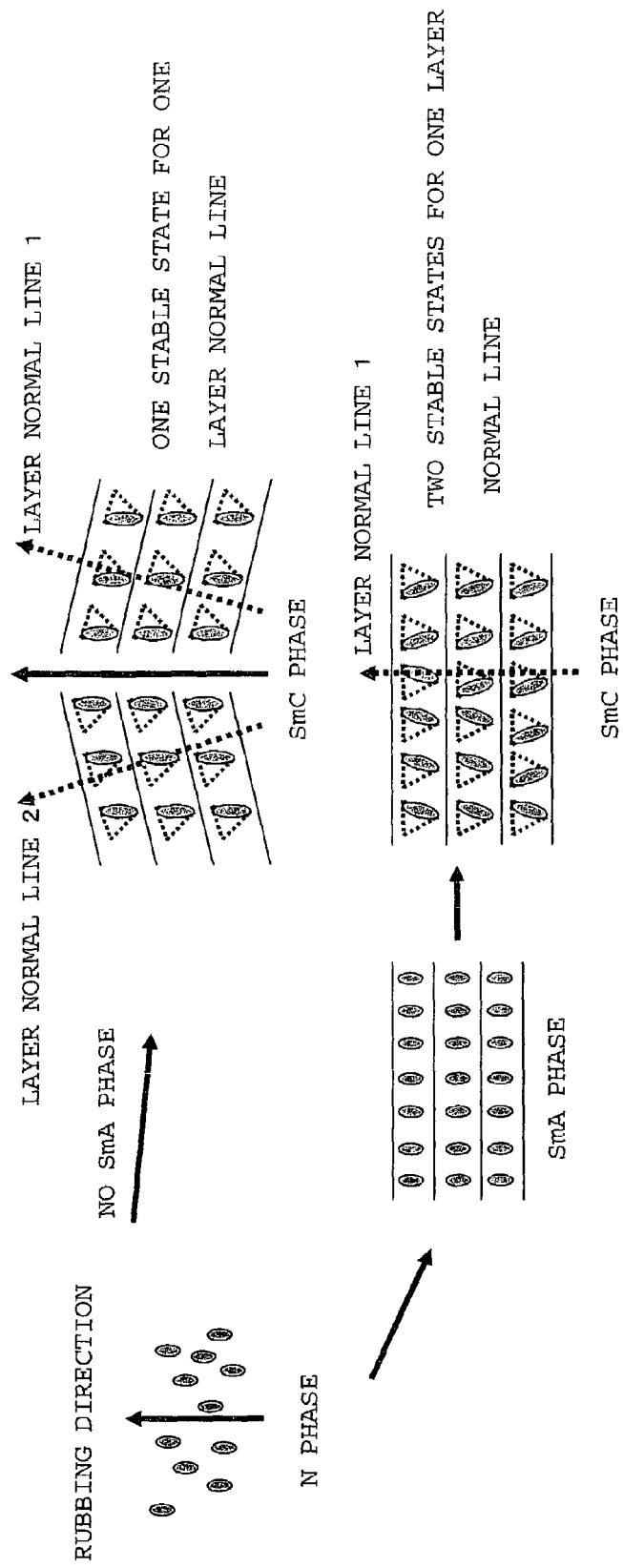
FIG. 2 is a view illustrating a difference of alignment defects based on a difference of the phase series that ferroelectric liquid crystal has.
Figure 3:
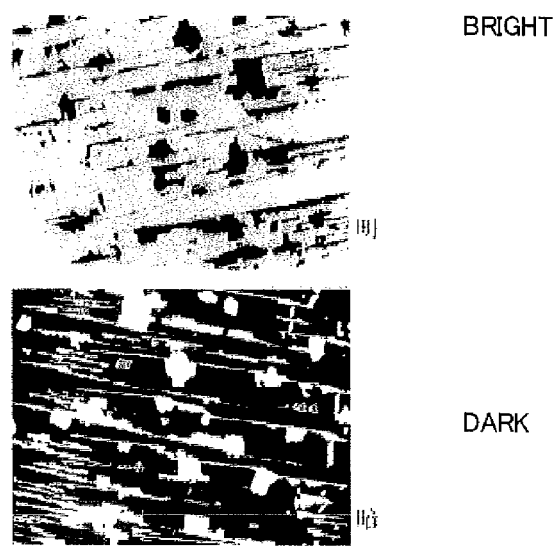
FIG. 3 is a photograph showing double domains which are alignment defects of ferroelectric liquid crystal.

1 . . . liquid crystal layer
2a, 2b . . . photo alignment layer
3a . . . common electrode
3b . . . x electrode
3c . . . y electrode
3d . . . pixel electrode
4a, 4b . . . substrate
5a, 5b . . . polarizing plate
7 . . . TFT element

BEST MODE FOR CARRYING OUT THE INVENTION

The liquid crystal display of the present invention will be described in detail herein after. The liquid crystal display of the invention is a liquid crystal display comprising a ferroelectric liquid crystal sandwiched between two substrates in which an electrode and a photo alignment layer are successively formed on each of opposite faces of the two substrates, and the constituent material of the respective photo alignment layer has a composition different from each other so as to sandwich the ferroelectric liquid crystal.

Figure 4:
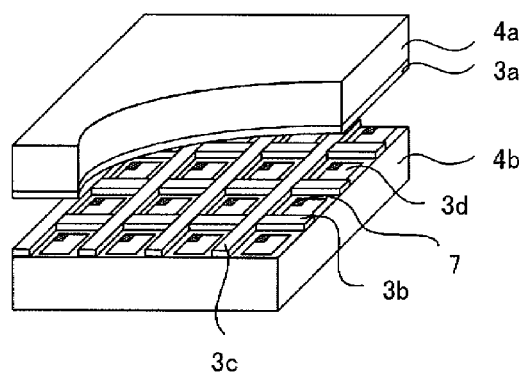
FIG. 4 is a schematic perspective view illustrating one example of the liquid crystal display of the present invention.
Figure 5:
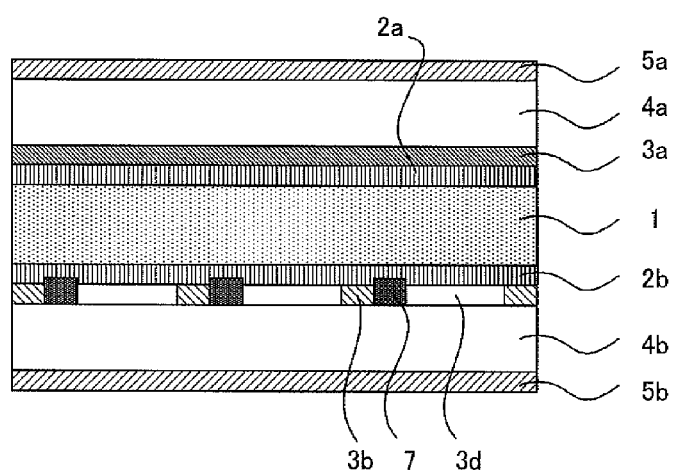
FIG. 5 is a schematic sectional view illustrating one example of the liquid crystal display of the present invention.

The liquid crystal display of the invention will be described with reference to the drawings. FIG. 4 is a schematic perspective view illustrating one example of the liquid crystal display of the present invention, and FIG. 5 is a schematic sectional view thereof. As shown in FIGS. 4 and 5, a common electrode 3a is formed on a substrate 4a, and x electrodes 3b, y electrodes 3c and pixel electrodes 3d are formed on an opposite substrate 4b. Inside an electrode layer that these electrodes constitute are formed photo alignment layers 2a and 2b. A ferroelectric liquid crystal is sandwiched between the photo alignment layers 2a and 2b to constitute a liquid crystal layer 1. In FIG. 4, the illustration of photo alignment layers 2a and 2b is omitted.

Polarizing plates 5a and 5b may be formed outside of the substrates 4a and 4b. This makes it possible to convert incident light into linear polarized light so that the liquid crystal display can transmit only light polarized in the alignment direction of the liquid crystal molecules. The polarizing plates 5a and 5b are arranged in such a manner that the polarization direction thereof is twisted at 90°. This makes it possible to control the direction of the optical axis of the liquid crystal molecules or the magnitude of the birefringence of the liquid crystal molecules between states that voltage is not applied thereto and is applied thereto, and to produce a bright state and a dark state by use of the ferroelectric liquid crystal molecules as a black and white shutter. For example, in the state that no voltage is applied, the light transmitted through the polarizing plate 5a cannot be caused to rotate its polarization direction at an angle of 90° by setting the polarizing plate 5a to make consistent with the alignment of the liquid crystal molecules. Consequently, this light is blocked by the polarizing plate 5b so that the liquid crystal is turned into a dark state. On the other hand, in the state that voltage is applied, the direction of the liquid crystal molecules are changed by the voltage so that the optical axis thereof rotates by an angle of θ from the initial state, whereby the polarization direction of the light is twisted at 90°. As a result, the light is transmitted through the polarizing plate 5b so that the liquid crystal is turned into a bright state. When the quantity of the transmitted light is controlled in accordance with the applied voltage, gray scale display can be attained.

The liquid crystal display of the invention has a photo alignment layer on each of opposite faces of upper and lower substrates and the photo alignment layers are made of materials different from each other to sandwich a ferroelectric liquid crystal as described above, thereby making it possible to restrain the generation of alignment defects such as zigzag defects, hairpin defects and double domains and yield the mono-domain alignment of the ferroelectric liquid crystal. The present invention causes the ferroelectric liquid crystal to be aligned without using the electric field induced technique (which uses DC voltage during cooling process); therefore, the invention has advantages that alignment disturbance, which is based on a rise in the temperature of the liquid crystal up to not lower than the phase transition point thereof and is a problem of the electric field induced technique, is not easily generated so that the invention is excellent in alignment stability. The reason why the use of materials different in composition, as the constituent materials of the photo alignment layers, gives a good alignment state is unclear, but would be based on the difference of the interaction between the upper photo alignment layer and the ferroelectric liquid crystal and between the lower photo alignment layer and the ferroelectric liquid crystal. Since a ferroelectric liquid crystal is used as a black and white shutter in the liquid crystal display of the invention as described above, the liquid crystal display has an advantage that the response speed thereof can be made large.

As shown in, for example, FIG. 4, the liquid crystal display of the present invention is preferably a display in which one of the substrates is rendered a TFT substrate in which thin film transistors (TFTs) 7 are arranged in a matrix form, the other substrate is rendered a common electrode substrate having the common electrode 3a formed on the whole area thereof, and the two substrates are combined with each other. Such liquid crystal display of an active matrix system using TFT elements will be described herein after.

In FIG. 4, in one of the substrates, its electrode is the common electrode 3a, and thus the substrate is a common electrode substrate. On the other hand, in the opposite substrate, its electrodes are composed of the x electrodes 3b, the y electrodes 3c and the pixel electrodes 3d, and thus the substrate is a TFT substrate. In this liquid crystal display, the x electrodes 3b and the y electrodes 3c are arranged lengthwise and crosswise, respectively. When signals are added to these electrodes, the TFT elements 7 are worked so as to drive the ferroelectric liquid crystal. Regions where the x electrodes 3b and the y electrodes 3c cross are insulated with an insulator layer, which is not illustrated. Signals to the x electrodes 3b and signals to the y electrodes 3c can be independently operated. Any region surrounded by the x electrodes 3b and the y electrodes 3c is a pixel, which is a minimum unit for driving the liquid crystal display of the invention. At least one out of the TFT elements 7 and at least one out of the pixel electrodes 3d are fitted to each of the pixels. In the liquid crystal display of the invention, the TFT elements 7 of the respective pixels can be worked by applying signal voltages successively to the x electrodes 3b and the y electrodes 3c.

Furthermore, the liquid crystal display of the invention can be used as color liquid crystal displays by forming a micro color filter in which TFT elements 7 are arranged in a matrix form between the common electrode 3a and the substrate 4a. Each of the constituent members of the liquid crystal display of the invention, as described above, will be described in detail herein after.

1. Constituent Members of Liquid Crystal Display (1) Photo Alignment Layer

The photo alignment layer is a film, wherein light the polarization of which is controlled is radiated onto a substrate coated with a constituent material of the photo alignment layer, to be described later, to generate photo-excited reaction (decomposition, isomerization or dimerization), thereby giving anisotropy into the obtained film to align liquid crystal molecules on this film.

The constituent material of the photo alignment layer used in the invention is not limited to any especial kind if the material has an effect of generating photo-excited reaction by the irradiation thereof with light to align the ferroelectric liquid crystal thereon (photoaligning). Such a material can be roughly classified into a photo-isomerizable type, in which only the shape of the molecule thereof changes so that the alignment thereof can reversibly change, and a photoreactive type, in which the molecule itself changes. Among them, in the present invention, a photo-isomerizable material comprising a photo-isomerization-reactive compound which generates a photo-isomerization reaction to give anisotropy to the photo alignment layer is preferable. Here, the photo-isomerization reaction means a phenomenon that a single compound is changed into some other isomer by the irradiation thereof with light. The use of such a photo-isomerizable-reactive material makes it possible to increase a stable isomer from plural isomers by the irradiation with light, whereby anisotropy can easily be given to the photo alignment layer.

The wavelength range of light which causes photo-excited reaction in the constituent material of the photo alignment layer is preferably within the wavelength range of ultra violet rays, that is, the range of 10 to 400 nm, more preferably within the range of 250 to 380 nm.

The photo-isomerization-reactive compound is not limited to any especial kind if the compound is a material capable of giving anisotropy to the photo alignment layer by photo-isomerization reaction, and is preferably a compound which has dichroism that different absorptivities are exhibited depending on the polarization direction thereof and generates photo-isomerization reaction by the light irradiation. By generating the isomerization of the reactive site aligned in the polarization direction of the photo-isomerization-reactive compound having such properties, anisotropy can easily be given to the photo alignment layer.

For the photo-isomerization-reactive compound, the photo-isomerization reaction is preferably the cis-trans isomerization reaction. This is because anyone of the isomers, a cis-isomer or a trans-isomer, increases by the light irradiation, whereby anisotropy can be given to the photo alignment layer.

Examples of the photo-isomerization-reactive compound used in the present invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo-isomerization-reactive compound include compounds having a cis-trans isomerization-reactive skeleton, such as an azobenzene skeleton or a stilbene skeleton.

In this case, the number of the cis-trans isomerization-reactive skeleton(s) in the molecule may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo-isomerization-reactive compounds of monomolecular compounds or polymerizable monomers as described above, any compound having in the molecule thereof an azobenzene skeleton is preferable as the photo-isomerization-reactive compound used in the present invention. This is because the azobenzene skeleton interacts highly with the liquid crystal molecules and is particularly suitable for the control of the alignment of the ferroelectric liquid crystal since the skeleton contains many $\pi$ electrons.

when the azobenzene skeleton is irradiated with linearly polarized ultra violet rays, the azobenzene skeleton of a trans isomer, as shown in the below formula (I), in which its molecule long axis is aligned in the polarization direction, is changed to the cis isomer thereof.

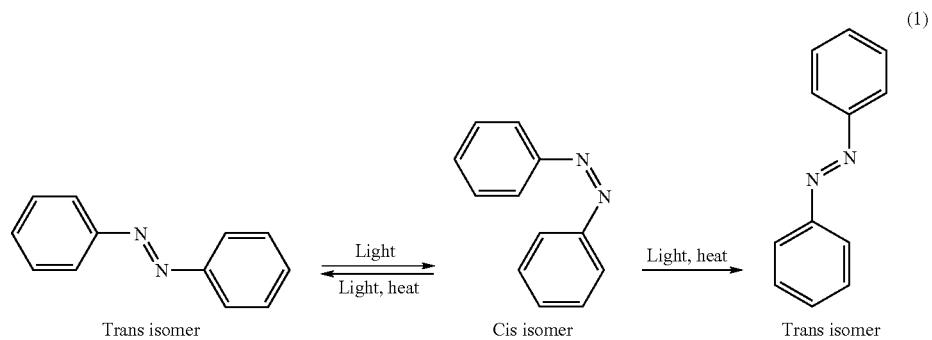

The photo-isomerization-reactive compound may have a group containing many $\pi$ electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula (1). Accordingly, when the azobenzene skeleton continues to absorb ultra violet rays, the ratio of the trans isomer at the right side increases so that the average alignment direction of the azobenzene skeleton becomes perpendicular to the polarized direction of ultra violet ray. In the present invention, this phenomenon is used to make alignment directions of skeletons of azobenzene consistent with each other, thereby giving anisotropy to the photo alignment layer to control the alignment of liquid crystal molecules on the film.

An example of a monomolecular compound out of the compounds each having in the molecule thereof an azobenzene skeleton used in the present invention may be a compound represented by the following formula.

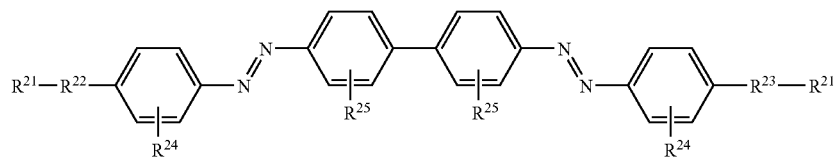

In the above formula, $R^{21}$s each independently represent a hydroxy group. $R^{22}$ represents a linking group represented by $-(A^{21}-B^{21}-A^{21})_m-(D^{21})_n-$ and $R^{23}$ represents a linking group represented by $(D^{21})_n-(A^{21}-B^{21}-A^{21})_m-$, wherein $A^{21}$ represents a bivalent hydrocarbon group, $B^{21}$ represents —O—, —COO—, —OCO—, —CONH—, —NHCO—, —NHCOO— or —OCONH—, m represents an integer of 0 to 3, $D^{21}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1. $R^{24}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt. $R^{25}$s each independently represent a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds.

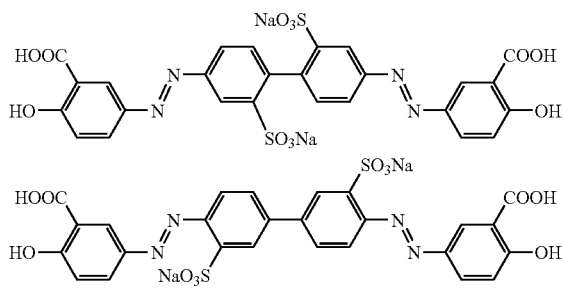

An example of the polymerizable monomer having in its side chain an azobenzene skeleton used in the present invention may be a compound represented by the following formula.

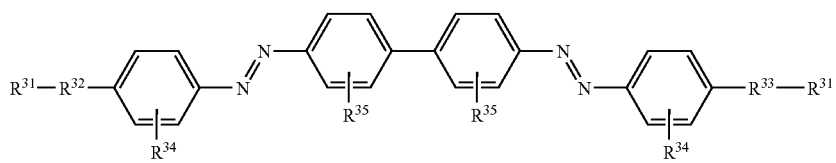

In the above formula, $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by $-(A^{31}-B^{31}-A^{31})_m(D^{31})_n-$ and $R^{33}$ represents a linking group represented by $(D^{31})_n-(A^{31}-B^{31}-A^{31})_m-$wherein $A^{31}$ represents a bivalent hydrocarbon group, $B^{31}$ represents —O—, —COO—, —OCO—, —CONH—, —NHCO—, —NHCOO— or —OCONH—, m represents an integer of 0 to 3, $D^{31}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1. $R^{34}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt. $R^{35}$s each independently represent a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound.

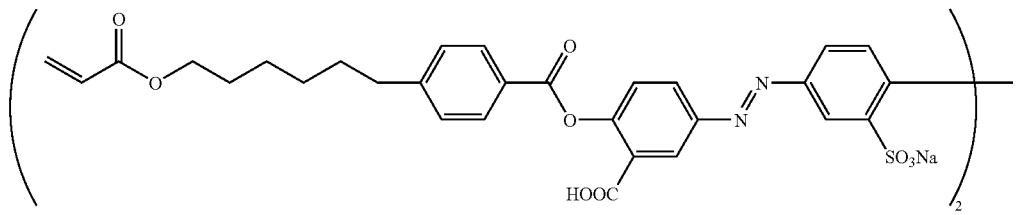

In the present invention, the compositions of the upper and lower photo alignment layers can be made different by variously selecting the cis-trans isomerization reactive compound or the substituent according to the required characteristics out of the photo-isomerization-reactive compounds. In this case, as the photo-isomerization-reactive compounds used for the upper and lower photo alignment layers, those having the same cis-trans isomerization reactive skeletons or those having different ones can be used as well. Moreover, two or more kinds of the photo-isomerization-reactive compounds can be used in a combination so that the compositions of the upper and lower photo alignment layers can be changed by changing the combination or changing the composition ratios of the same combination.

Additives, besides the above-mentioned photo-isomerization-reactive compound, may be contained as constituent materials of the photo alignment layer used in the present invention as long as the photoaligning of the photo alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001 to 20% by weight, more preferably from 0.1 to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

As mentioned above, in the present invention, the constituent materials for the photo alignment layer 2a and the photo alignment layer 2b have different compositions. In the present invention, the compositions of the upper and lower photo alignment layers can be made different by variously selecting the cis-trans isomerization reactive skeleton or the substituent from the photo-isomerization-reactive compound according to the required characteristics, and the compositions can be changed by changing the addition amount of the additives as well.

The following will describe the photo alignment treatment method. First, the face of an electrode-formed substrate which is to oppose to a liquid crystal layer is coated with a coating solution in which the above-mentioned constituent material of the photo alignment layer is diluted with an organic solvent, and then the solution is dried. In this case, the content of the photo-isomerization-reactive compound in the coating solution is preferably from 0.05 to 10% by weight, more preferably from 0.2 to 5% by weight. If the content of photo-isomerization-reactive compound is too small, an appropriate anisotropy is not easily given to the photo alignment layer. Conversely, if the content is too large, the viscosity of the coating solution becomes so high that a homogeneous coat film is not easily formed.

The coating method which can be used is spin coating, roll coating, rod bar coating, spray coating, air knife coating, slot die coating, wire bar coating or the like.

The thickness of the film obtained by the coating with the constituent material is preferably from 1 to 200 nm, more preferably from 3 to 100 nm. If the thickness of the film is too small, a sufficient photoaligning may not be obtained. Conversely, if the thickness is too large, the alignment of the liquid crystal molecules may be disturbed and further, costs therefor are not preferred.

The resultant film causes photo-excited reaction by the irradiation thereof with light the polarization of which is controlled, whereby anisotropy can be given. The wavelength range of the radiated light should be appropriately selected in accordance with the constituent material of the used photo alignment layer. It is preferably the range of ultra violet ray wavelengths, that is, the range of 100 to 400 nm, more preferably the range of 250 to 380 nm.

Moreover, the photo alignment treatment of the film can also be conducted by radiating oblique non-polarized ultra violet rays. The direction of the light is not especially limited if the direction makes it possible to generate the photo-excited reaction. It is preferably in the range of 0° to 45° oblique to the substrate face of the upper and lower photo alignment layers, more preferably in the range of 30° to 45° oblique thereto since the alignment state of the ferroelectric liquid crystal can be made good.

In the case of using a polymerizable monomer as described above as the photo-isomerization-reactive compound used in the invention, the photo alignment treatment is conducted, and then the monomer is heated, thereby polymerizing the monomer. In this way, the anisotropy given to the photo alignment layer can be made stable.

(2) Liquid Crystal Layer

The liquid crystal layer used in the invention is made by sandwiching a ferroelectric liquid crystal between the photo alignment layers. The ferroelectric liquid crystal used in the liquid crystal layer is not limited to any especial kind if the ferroelectric liquid crystal exhibits a chiral smectic C phase (SmC*). The liquid crystal is preferably a ferroelectric liquid crystal material the phase series of which is a phase change from a cholesteric phase (Ch) to a chiral smectic C phase (SmC*) via no smectic A phase (SmA).

The liquid crystal display of the present invention is preferably driven by an active matrix system using thin film transistors (TFTs), and can be rendered a color liquid crystal display by adopting a color filter system or a field sequential color system. In such a case, a material the phase of which changes from a Ch phase through a SmA phase to a SmC* phase can be used as the ferroelectric liquid crystal. Alternatively, a material the phase of which changes from a Ch phase to a SmC* phase via no SmA phase may be used. However, in the case of driving the liquid crystal display of the invention, in particular, by a field sequential color system, it is preferable to use a liquid crystal material having mono-stability and undergoing phase transition via no SmA phase. The mono-stability herein means a nature that liquid crystal has only one stable state when no voltage is applied thereto, as described above. Particularly preferable is a ferroelectric liquid crystal undergoing half-V-shaped driving, in which liquid crystal molecules thereof work only when either one of positive or negative voltages is applied thereto since the liquid crystal makes it possible to lengthen the aperture time of a black and white shutter and realize bright color display.

The ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase produces an advantage that the production process becomes simple and the driving voltage can be made low.

The ferroelectric liquid crystal used in the invention may be, for example, "R2301" sold by Clariant (Japan) K.K.

The thickness of the liquid crystal layer made of the above-mentioned ferroelectric liquid crystal is preferably from 1.2 to 3.0 μm; more preferably from 1.3 to 2.5 μm; and even more preferably from 1.4 to 2.0 μm. If the thickness of the liquid crystal layer is too small, the contrast may lower. Conversely, if the thickness is too large, the liquid crystal may not be aligned with ease.

As the method for forming the liquid crystal layer, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrodes beforehand on a substrate and arranging the above-mentioned photo alignment layer, and then sealing the cell with an adhesive agent. The thickness of the liquid crystal layer can be adjusted with spacers such as beads.

(3) Substrate

The substrate used in the invention is not limited to any especial kind if the substrate can be generally used as a substrate of liquid crystal displays. Preferred examples thereof include glass plates and plastic plates. The surface roughness (RSM value) of the substrate is preferably 10 nm or less; more preferably 3 nm or less; and even more preferably 1 nm or less. The surface roughness in the invention can be measured with an atomic force microscope (AFM).

(4) Electrodes

The electrodes used in the invention are not limited to any especial kind if the electrodes are electrodes which are generally used as electrodes of liquid crystal displays. At least one of the electrodes is preferably an electrode made of a transparent conductor. Preferred examples of the material of the transparent conductor include an indium oxide, at in oxide, and an indium tin oxide (ITO). In the case of rendering the liquid crystal display of the invention a liquid crystal display of an active matrix system using TFT, one of upper and lower electrodes is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 μm or less. If the difference between the concave and convex portions of the electrode layer is over 0.2 μm, alignment disturbance is easily generated.

About the above-mentioned electrodes, a transparent electroconductive film can be formed on the above-mentioned substrate by a vapor deposition method such as CVD, sputtering, or ion plating, and then this is patterned into a matrix form, whereby the x electrodes and the y electrodes can be obtained.

(5) Polarizing Plate

The polarizing plate used in the invention is not limited to any especial kind if the plate is a member for transmitting only a specific direction of wave motions of light. It is possible to use a member which is generally used as a polarizing plate for liquid crystal displays.

2. Process for Producing Liquid Crystal Display

The liquid crystal display of the invention can be produced by a process that is generally used as a process for producing liquid crystal displays. The following will describe a process for producing liquid crystal display of an active matrix system using TFT elements as one example of the process for producing a liquid crystal display of the invention. A transparent electroconductive film is first formed on a substrate by the above-mentioned vapor deposition method, so as to form a full-face common electrode. A transparent electroconductive film is patterned into a matrix form on the other substrate to form x and y electrodes, and switching elements and pixel electrodes are set up.

Next, the two substrates, on which the electrodes are formed, are coated with photo alignment layer materials having different compositions, respectively, and then subjected to photo alignment treatment to form photo alignment layers. Beads are dispersed, as spacers, onto one of the thus-formed photo alignment layers, and a sealing agent is applied to the periphery thereof. The two substrates are stuck onto each other so as to make the photo alignment layers opposite to each other. The substrates are then thermally compressed. Capillary effect is used to inject a ferroelectric liquid crystal, in an isotropic liquid state, from an injecting port thereinto, and then the injecting port is sealed with an ultra violet curing resin or the like. Thereafter, the ferroelectric liquid crystal is slowly cooled, whereby the liquid crystal can be aligned. Polarizing plates are stuck onto the upper and the lower of the thus-obtained liquid crystal cell, whereby liquid crystal display of the present invention can be yield.

3. Usage of Liquid Crystal Display

The liquid crystal display of the present invention can be used as a color liquid crystal display by adopting a color filter system or a field sequential color system. Since the color liquid crystal display using the liquid crystal display of the invention makes it possible to align ferroelectric liquid crystal without generating alignment defects such as double domains, it is possible to realize highly precise color display having a wide field angle and high-speed responsibility.

It is preferred to display the liquid crystal display of the invention by the field sequential color system out of these for the following reason. As described above, the field sequential color system is a system in which each pixel is subjected to time sharing, and thus high-speed responsibility is particularly necessary in order to obtain a good moving image display characteristic.

In this case, it is preferred to use a liquid crystal material having mono-stability, in which a SmC* phase is exhibited from a Ch phase via no SmA phase, and it is particularly preferred to use a material undergoing half-V-shaped driving, in which liquid crystal molecules thereof work only when either one of positive or negative voltages is applied thereto. When such a material undergoing half-V-shaped driving is used, it is possible to make light leakage less when dark regions operate (when a black and white shutter is closed), and make the aperture time of the black and white shutter sufficiently long. This makes it possible to display respective colors switched with time more brightly to realize a bright color liquid crystal display.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be described in more detail by way of the following examples. Compounds 1 to 6 represented by the following formulae were used as photo-isomerization-reactive compounds.

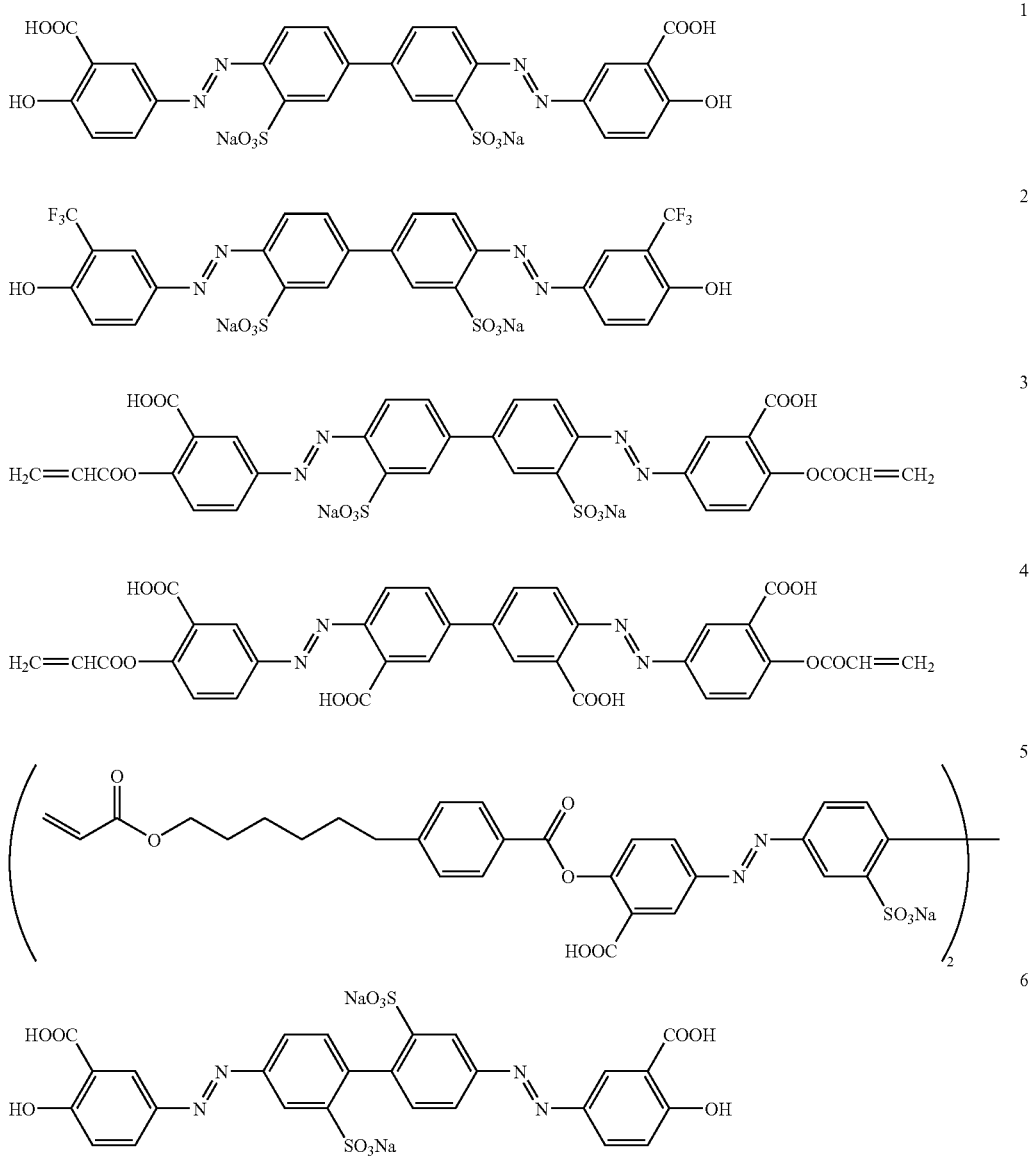

Example 1

Two glass substrates each coated with ITO were spin-coated with a 1% by weight solution of the compound 1 dissolved in N-methyl-2-pyrrolidin one and 2-n-butoxyethanol (50:50% by weight) and a 1% by weight solution of the compound 5 dissolved in N-methyl-2-pyrrolidin one and 2-n-butoxyethanol (50:50% by weight) at a rotation frequency of 4000 rpm for 30 seconds. The substrate spin-coated with the solution of the compound was dried at 100° C. in an oven for 1 minute, and then polarized ultra violet rays were radiated onto the substrate at 1000 mJ/cm$^2$ and at 25° C. Furthermore, the one having the solution of the compound 5 spin-coated was heated at 150° C. under the atmosphere of nitrogen for 1 hour after the exposure. Spacers of 1.5 µm size were sprayed onto one of the substrates, and a sealing material was applied onto the other substrate with a seal disperser. Thereafter, the substrates were fabricated in parallel to the radiation direction of the polarized ultra violet rays and in an anti-parallel state, and then thermally compressed. As the liquid crystal, the "2301" (manufactured by Clariant (Japan) K.K.) was used. The liquid crystal was attached to the upper of an injecting port thereof, and an oven was used to perform the injection of the liquid crystal at a temperature higher by 10° C. to 20° C. than the phase transition temperature between nematic and isotropic phases. The temperature was slowly returned to room temperature so that a mono-domain phase having no alignment defects was obtained.

Comparative Example 1

Two glass substrates each coated with ITO were spin-coated with a 1% by weight solution of the compound 1 dissolved in N-methyl-2-pyrrolidin one and 2-n-butoxyethanol (50:50% by weight), at a rotation frequency of 4000 rpm for 30 seconds. Thereafter, they were dried and subjected to exposure treatment in the same manner as in Example 1, thereafter, the resultant was heated at 150° C. under the atmosphere of nitrogen for 1 hour. Furthermore, they were fabricated into a cell by the above-mentioned method, and then the liquid crystal was injected thereinto. As a result, no mono-domain phase was obtained, and alignment defects such as double domains, zigzag defects and hairpin defects were generated.

Comparative Example 2

Two glass substrates each coated with ITO were spin-coated with a 1% by weight solution of the compound 5 dissolved in N-methyl-2-pyrrolidin one and 2-n-butoxyethanol (50:50% by weight), at a rotation frequency of 4000 rpm for 30 seconds. Thereafter, they were dried and subjected to exposure treatment in the same manner as in Example 1, thereafter, the resultant was heated at 150° C. under the atmosphere of nitrogen for 1 hour. Furthermore, they were fabricated into a cell by the above-mentioned method, and then the liquid crystal was injected thereinto. As a result, no mono-domain phase was obtained, and alignment defects such as double domains, zigzag defects and hairpin defects were generated.

Example 2

In the same manner as in Example 1 except that the compound 2 was used instead of the compound 1 in Example 1, a mono-domain phase without an alignment defect was obtained.

Example 3

Two glass substrates each coated with ITO were spin-coated with a 1% by weight solution of the compound 3 dissolved in N-methyl-2-pyrrolidin one and 2-n-butoxyethanol (50:50% by weight) and a 1% by weight solution of the compound 5 dissolved in N-methyl-2-pyrrolidin one and 2-n-butoxyethanol (50:50% by weight) at a rotation frequency of 4000 rpm for 30 seconds. The substrate spin-coated with the solution of the compound was dried at 100° C. in an oven for 1 minute, and then polarized ultra violet rays were radiated onto the substrate at 1000 mJ/cm$^2$ and at 25° C. Furthermore, after exposure, the resultant was heated at 150° C. under the atmosphere of nitrogen for 1 hour. Spacers of 1.5 µm size were sprayed onto one of the substrates, and a sealing material was applied onto the other substrate with a seal disperser. Thereafter, the substrates were fabricated in parallel to the radiation direction of the polarized ultra violet rays and in an anti-parallel state, and then thermally compressed. As the liquid crystal, the "2301" (manufactured by Clariant (Japan) K.K.) was used. The liquid crystal was attached to the upper of an injecting port thereof, and an oven was used to perform the injection of the liquid crystal at a temperature higher by 10° C. to 20° C. than the phase transition temperature between nematic and isotropic phases. The temperature was slowly returned to room temperature so that a mono-domain phase having no alignment defects was obtained.

Example 4

In the same manner as in Example 1 except that the compound 4 was used instead of the compound 3 in Example 3, a mono-domain phase without an alignment defect was obtained.

Example 5

In the same manner as in Example 1 except that the compound 3 was used instead of the compound 5 in Example 1, a mono-domain phase without an alignment defect was obtained.

Example 6

In the same manner as in Example 6) except that the compound 4 was used instead of the compound 5 in Example 1, a mono-domain phase without an alignment defect was obtained.

Example 7

Two glass substrates each coated with ITO were spin-coated with a 1% by weight solution of the compound 5 dissolved in N-methyl-2-pyrrolidin one and 2-n-butoxyethanol (50:50% by weight) and a 1% by weight solution of the compound 6 dissolved in N-methyl-2-pyrrolidin one and 2-n-butoxyethanol (50:50% by weight) at a rotation frequency of 4000 rpm for 30 seconds. The substrate spin-coated with the solution of the compound was dried at 100° C. in an oven for 1 minute, and then polarized ultra violet rays were radiated onto the substrate at 1000 mJ/cm$^2$ and at 25° C. Furthermore, the one having the solution of the compound 5 spin-coated was heated at 150° C. under the atmosphere of nitrogen for 1 hour after the exposure. Spacers of 1.5 µm size were sprayed onto one of the substrates, and a sealing material was applied onto the other substrate with a seal disperser. Thereafter, the substrates were fabricated in parallel to the radiation direction of the polarized ultra violet rays and in an anti-parallel state, and then thermally compressed. As the liquid crystal, the "2301" (manufactured by Clariant (Japan) K.K.) was used. The liquid crystal was attached to the upper of an injecting port thereof, and an oven was used to perform the injection of the liquid crystal at a temperature higher by 10° C. to 20° C. than the phase transition temperature between nematic and isotropic phases. The temperature was slowly returned to room temperature so that a mono-domain phase having no alignment defects was obtained.

The invention claimed is:

1. A producing method for a liquid crystal display comprising steps of:
   forming photo alignment layers on two substrates where electrodes are formed, by using photo alignment layer materials having different compositions for each photo alignment layer, wherein a constituent material of the respective photo alignment layer is a photo-isomerizable material or a photoreactive material which generates a photoreaction to give anisotropy to the photo alignment layer;
   sticking the two substrates onto each other so as to make the photo alignment layers formed on the substrates face each other;
   injecting between the photo alignment layers a ferroelectric liquid crystal, wherein the ferroelectric liquid crystal has no smectic A phase in a phase series thereof, exhibits mono-stability and undergoes half-V-shaped driving; and
   forming a liquid crystal layer without using an electric field induced technique, wherein the ferroelectric liquid crystal is aligned by slow cooling, and further wherein the ferroelectric liquid crystal forms mono-domain alignment.

2. The producing method for a liquid crystal display according to claim 1, wherein a constituent material of the respective photo alignment layer is a photo-isomerizable material comprising a photo-isomerization-reactive compound which generates a photo-isomerization reaction to give anisotropy to the respective photo alignment layer.

3. The producing method for a liquid crystal display according to claim 2, wherein the photo-isomerization-reactive compound is a compound which has dichroism that different absorptivities are exhibited depending on a polarization direction thereof and further generates the photo-isomerization reaction by a light irradiation.

4. The producing method for a liquid crystal display according to claim 2, wherein the photo-isomerization reaction is a cis-trans isomerization reaction.

5. The producing method for a liquid crystal display according to claim 2, wherein the photo-isomerization-reactive compound is a compound having, in a molecule thereof, an azobenzene skeleton.

6. The producing method for a liquid crystal display according to claim 2, wherein the photo-isomerization reactive compound is a polymerizable monomer having, as its side chain, an azobenzene skeleton.

7. The producing method for a liquid crystal display according to claim 1, wherein the ferroelectric liquid crystal is a liquid crystal which constitutes a single phase.

8. The producing method for a liquid crystal display according to claim 1, wherein the liquid crystal display is driven by an active matrix system using a thin film transistor.

9. The producing method for liquid crystal display according to claim 1, wherein the liquid crystal display is displayed by a field sequential color system.

* * * * *